(No Model.)

J. E. BUCKINGHAM.
DOOR SECURER.

No. 349,688. Patented Sept. 28, 1886.

Witnesses:
Jas. E. Hutchinson.
Henry C. Hazard.

Inventor,
John E. Buckingham

United States Patent Office.

JOHN E. BUCKINGHAM, OF WASHINGTON, DISTRICT OF COLUMBIA.

DOOR-SECURER.

SPECIFICATION forming part of Letters Patent No. 349,688, dated September 28, 1886.

Application filed February 3, 1886. Serial No. 190,716. (No model.)

*To all whom it may concern:*

Be it known that I, JOHN E. BUCKINGHAM, a citizen of the United States, residing at Washington, in the District of Columbia, have invented a new and useful Improvement in Door-Securers, of which the following is a specification, reference being had to the accompanying drawings, in which—

Figure 1:
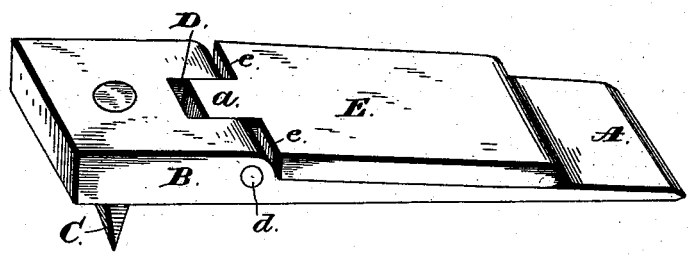
Figure 2:
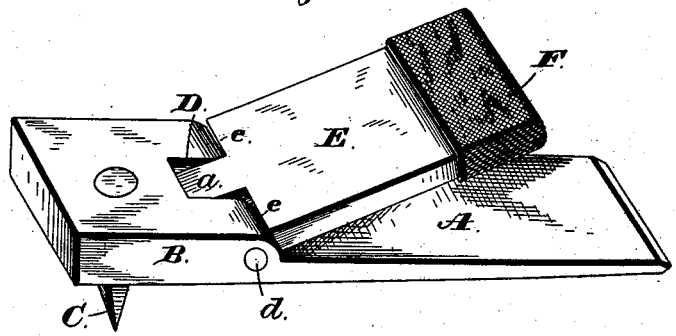
Figure 3:
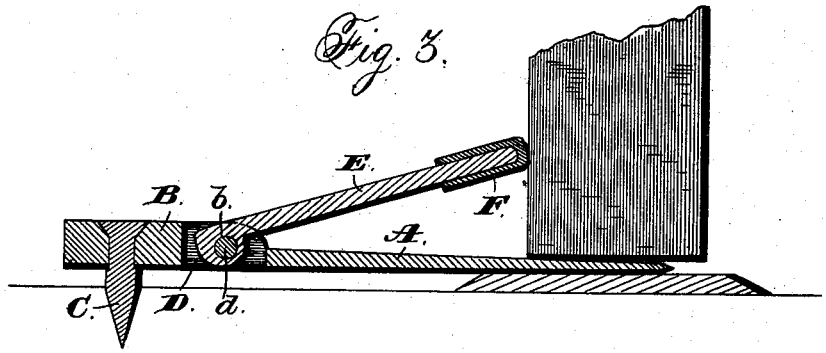

Figure 1 is a perspective view of my device as when folded up. Fig. 2 is a like view of said device as arranged for use, and Fig. 3 is a sectional view of the same as applied to a door.

Letters of like name and kind refer to like parts in each of the figures.

My invention relates to an improvement in door-securers, the object of the same being to provide a portable device that shall combine simplicity, be compact, and occupy but little space when folded, and economy in construction with durability and efficiency in use.

With these ends in view my invention consists, first, in the combination, with the main bar having a slot therein and a spur secured thereto near said slot, of the supplemental or locking bar pivoted to the main bar within the slot, and provided with shoulders adapted to engage the main bar and limit the rearward movement of the supplemental bar.

My invention further consists in the combination, with the main bar and the supplemental bar pivoted thereto, of a yielding cap secured to the free end of the supplemental bar.

My invention further consists in the parts and combination of parts, as will be more fully described, and pointed out in the claims.

In the annexed drawings, A represents the main bar, wedge-shaped longitudinally for a greater part of its length, and provided on its upper face with the enlargement B and with a spur, (one or more,) C, rigidly secured to the lower face of the said enlarged portion of the bar, and adapted to be driven into the floor, for a purpose to be hereinafter described.

D represents a slot formed in the bar A, at the junction of the wedge-shaped and enlarged portion thereof, for the reception of the reduced end $a$ of the supplemental bar E. The reduced end of the supplemental bar is provided with an eye, registering with the eye $b$ of the main bar, through which passes the connecting-pin $d$. The supplemental bar E rests on the upper surface of the main bar, and is provided on opposite sides of the reduced portion with the shoulders $e$, which latter, when the parts are in their closed position, rest in front of and in close proximity to the front edge of the enlarged portion of the main bar. When the supplemental bar is turned rearwardly at or approximately at right angles to the main bar, these shoulders come in contact with the upper surface of the enlarged portion of the main bar, and prevent further rearward movement, and form an effective stop or abutment for the door. The free end of the supplemental bar is provided with a rubber cap or tip, F, which latter prevents the device from injuring the door or scratching the paint.

The manner of using my device is as follows: The door is first closed, the supplemental bar turned rearwardly to a position at right angles to the main bar, and the main bar then introduced under the lower end of the door, preferably near the free edge thereof. The supplemental bar is then released, and the device secured in position by pressing down on the supplemental bar and inner or enlarged end of the main bar. This forces the spur into the floor, and also forces the rubber tip of the supplemental bar into contact with the door, and holds the door securely in its closed position until the device is removed.

I am aware that a plate adapted to be put under the lower edge of the door and bear against the inner face of the same has been pivotally attached to a bar having a spur at the outer end thereof; also, that it is old to provide a main bar with ratchet-teeth and a supplemental bar or plate pivoted to the main bar, and provided with a dog adapted to engage the teeth of the bar; hence I make no claim to such constructions.

Having fully described my invention, what I claim as new is—

1. The combination, with the wedge-shaped main bar, the enlarged end of which is slotted, as described, and provided with a depending spur, of the supplemental bar pivoted within the slotted portion of the main bar and provided with shoulders, substantially as and for the purpose described.

2. The combination, with the wedge-shaped main bar, the enlarged end of which is slotted, as described, and provided with a depending spur, of the supplemental bar having the shoulders and the rubber tip secured on the free end of said supplemental bar, substantially as set forth.

In testimony whereof I hereunto set my hand and seal this 28th day of January, 1886.

JOHN E. BUCKINGHAM. [L. S.]

Witnesses:
SAML. K. BEHREND,
E. S. BRANDT.